Aug. 15, 1961  W. SCHULLER  2,996,102
MANUFACTURE OF A WEB OR MAT MADE FROM GLASS FIBRE OR
A SUBSTANCE HAVING SIMILAR CHARACTERISTICS
Filed April 19, 1955  4 Sheets-Sheet 2
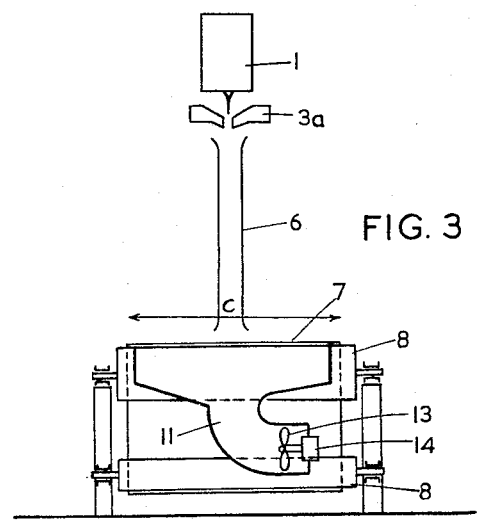
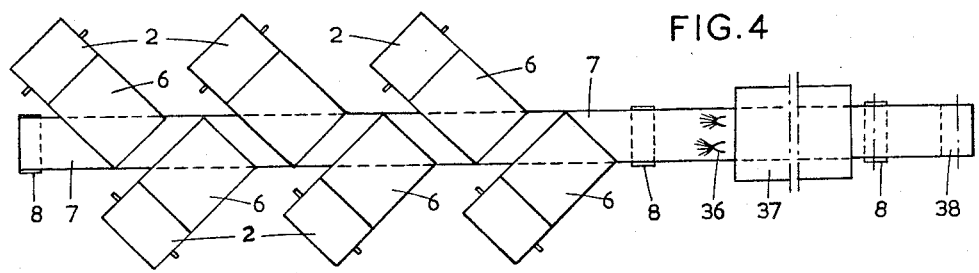
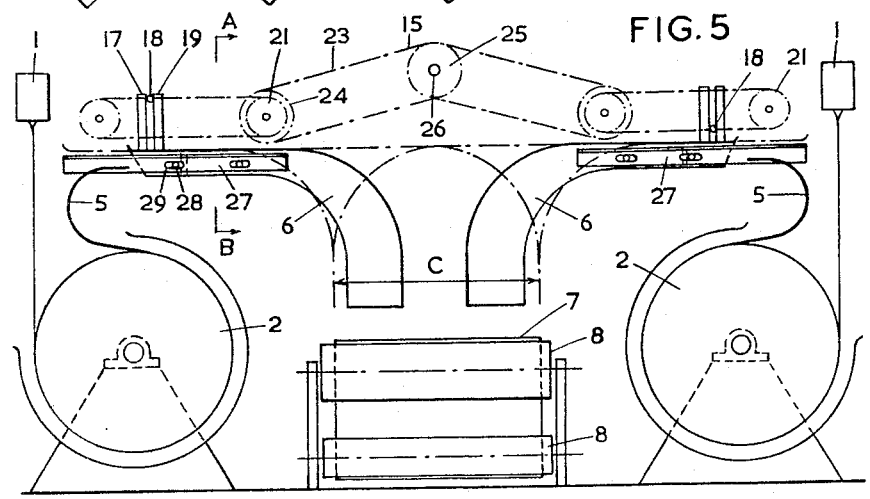
Inventor:
Werner Schuller

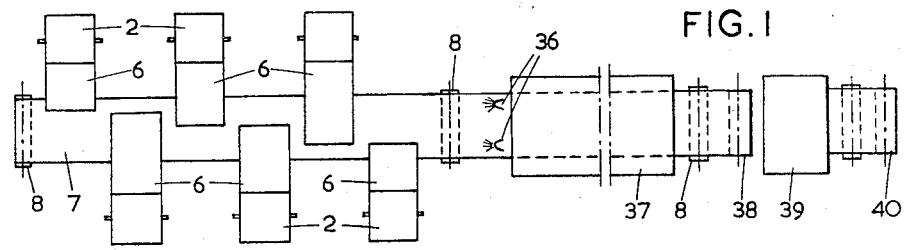
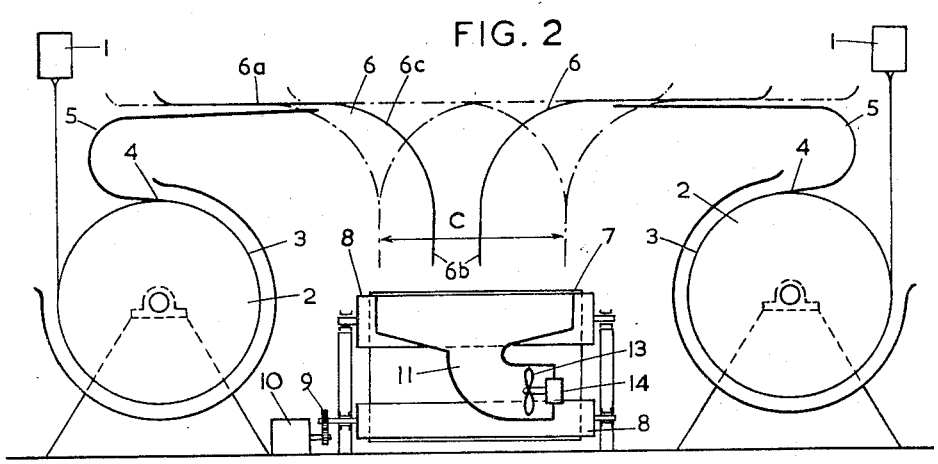
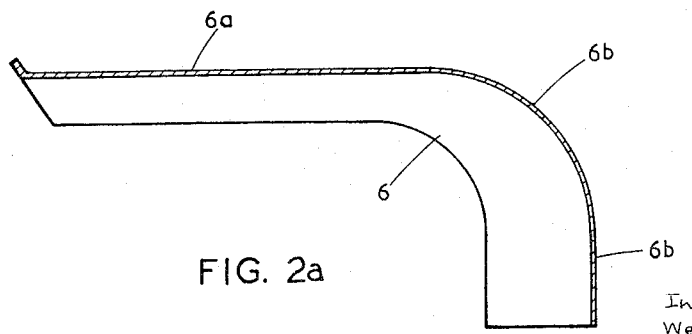

2,996,102
MANUFACTURE OF A WEB OR MAT MADE FROM GLASS FIBRE OR A SUBSTANCE HAVING SIMILAR CHARACTERISTICS
Werner Schuller, 88 Lawton Road, Alsager, England
Filed Apr. 19, 1955, Ser. No. 502,311
Claims priority, application Great Britain Apr. 23, 1954
9 Claims. (Cl. 154—1)

The invention relates to the manufacture of a mat or web from glass fibre or the like, which may be subsequently treated in the manufacture of various products of which the web or mat forms the basis.

It is known to produce a web or tissue or glass fibre by various methods in which the fibres are bonded together by emulsions of synthetic resins or other thermoplastic materials. According to a known process for example, a continuous filament is drawn-off from molten or re-heated glass rods (the "rod" process) or marbles (the "marble" process) by means of a fast rotating drum, the filaments being then divided into fibres of varying staple lengths and finally deposited on a continuous belt to form a web or mat.

The "rod" and "marble" processes have the disadvantage in the production of a thin web or mat in that a single fibre-producing oven is used, in which the longitudinal axis of the oven is always in a fixed position and disposed transversely to the direction of movement of the continuous belt on which the fibres are deposited with the result that the rate of production is limited to the fibre output of one single machine. A further disadvantage is, that if only a few filaments happen to break between the oven and the drum, a weak spot in the web or mat is bound to develop, due to uneven supply of fibre and the process has continuously to be interrupted. Even thickness and eveness of fibre distribution are essential for ensuring the quality of the fibre mat of the finished article made from such mats.

In another known process, a plurality of marble fed ovens or bouchings are installed in a fixed position, relatively to the conveyor belt, and used in combination with high pressure air or steam to produce a mat on the moving belt. This process also has the disadvantage that even distribution of fibres over the whole width of the belt cannot be obtained, because it is not possible effectively to control the fibre to flow evenly; such a mat cannot, therefore, be used for making web, mat or felt, where eveness of fibre distribution is required both in the crosswise and lengthwise directions.

The invention has among its objects to avoid these disadvantages, and in simple and continuous manner to provide means which is not only relatively inexpensive but affords an eveness in fibre distribution in the mat or web, hitherto never attained.

A further object of the invention is to provide a method of manufacture for such a mat or web in which the tensile strength of the mat or web in both longitudinal and transverse directions may be varied as desired.

According to the process of the invention for the continuous production of a web or mat of glass fibres or of materials having similar physical characteristics, such as mineral or plastic fibres, fibres in the form of staple fibres produced in any convenient manner, are deposited on a continuous moving, air-pervious belt, the fibres being deposited on the belt by passing under gravity through one or more fibre-distributing heads which are reciprocated relative to the belt in such manner as to deliver and deposit the fibres evenly in a direction transverse to the length of the conveyor on the belt, the angle at which the fibres are deposited on the belt bearing a desired and predetermined relation to the direction of movement and/or speed of the belt. By "reciprocating" is understood a to and fro movement in a straight line. The fibre-producing devices or ovens with the fibre distributing heads are, according to the invention, mounted with their longitudinal axes lying transverse to the direction of the belt movement, either parallel to, or at an angle of between plus or minus 1° to 180° to the belt and drive means provided for imparting reciprocating movement to the distributing heads. The direction of movement of adjacent distributing heads at any one time, is advantageously opposite.

By the process of the invention, using fibre-producing machines at, for example ten or more fibre-producing positions, it is now possible to increase the production tenfold or more on a single belt, using one drying oven only. Furthermore, it is now possible by depositing the fibres in a direction or directions transversely and at an inclination to the longitudinal axis of the belt to ensure an even distribution of fibres over the whole width of the belt, and in such manner that the ratio of tensile strength in the longitudinal and transverse directions may be varied as desired. No additional reinforcement in either direction is needed in this way. Webs or mats of fine glass fibres of a superior quality may thus be produced cheaply, in a mass production method, so that bonded mats, after impregnation with bitumen, asphalt, coal tar, resins or other plastic materials are available, wherever an even density of fibres in the mat is essential.

According to the invention furthermore, the angle at which the fibres are deposited on the conveyor belt may be varied by varying the relative reciprocating speed of the fibre-distributing heads across the belt and/or by varying the belt speed. In this way the tensile strength of the mat or web either in the longitudinal or in the transverse directions may be increased or decreased as desired within determined limits.

Such webs or mats produced in the manner described may be used, because of their considerably cheaper and simpler production method, to replace woven fabrics. Such a mat or web combines the characteristics of any desired strength ratio of fabric in the longitudinal and transverse directions, and even density of the mat or web.

According to the invention furthermore, the fibres pass freely in a curved path from the position of formation to the position of deposition on the conveyor belt being shielded against outside influences by a member advantageously of channel section, which is so shaped and/or dimensioned as to cause the staple fibres to flow freely from the position of manufacture to be deposited under gravity on the conveyor belt.

The process according to the invention is diagrammatically illustrated by way of example in the accompanying drawings, in which FIGURE 1 illustrates a plan view of a complete group machine installation for carrying out the process of the invention.

FIGURE 2 is a cross-section on an enlarged scale of a group machine, with the fibre-producing means disposed lengthwise and on both sides of a conveyor belt.

FIGURE 2a is a cross-section on an enlarged scale of a guide member.

FIGURE 3 shows the layout of a single row of fibre-producing means.

FIGURE 4 is a plan showing a number of fibre producing means disposed at an angle of the longitudinal axis of the conveyor belt.

FIGURE 5 is a section showing the drive for the reciprocating transverse movement of two adjacent fibre-distributing heads adapted to move in opposite directions at the same moment.

Figure 6:
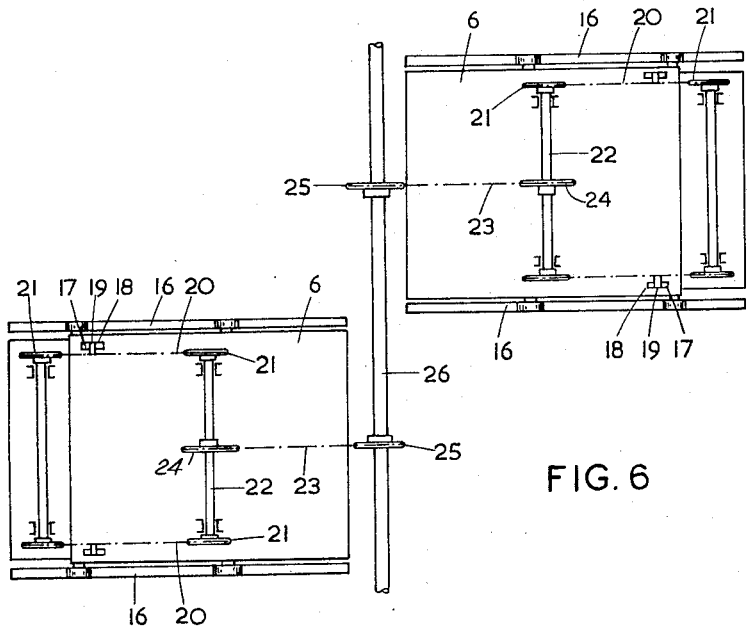
FIGURE 6 is a corresponding plan.

Referring to the drawings, the glass filaments are produced in any convenient known method advantageously according to the process described and claimed in British Patent No. 628,145. The filaments are drawn from a fibre-producing position such as a furnace 1 (FIGURE 2) by means of a rotating drum 2. The filaments are removed from the periphery 3 of the drum 2 by means of a scraper device 4 by the aid of an air stream generated by the rotating drum. The fibres broken into staple fibres by the scraper device 4 are guided through a curved guide member 5 to pass freely along a distributing head 6. The guide member 5 is of sufficient length to overlap the distributing head 6.

The distributing head 6 is formed with a horizontal portion 6a and a vertical portion 6b joined by a curved intermediate portion 6c and is of channel section as shown in FIGURE 2a.

The staples fibres shielded from outside influences by the head 6 are deposited on an endless conveyor belt 7 moving over rollers 8 and driven by belt drive or through gearing 9, as shown, by an electric motor 10.

The belt 7 is air-pervious and may be perforated. Provided in a position directly below the upper part of the belt 7 is a suction box 11 which may be controlled by dampers provided at any number of positions along its length and is provided with a suction fan 13 driven from a motor 14.

The fibre-producing means are positioned on each side of the belt 7 with their distributing heads 6 immediately above and adjacent the belt 7. A number of fibre-producing positions for example six, as shown in FIGURE 1 may be provided to extend in lines on each side of the belt 7, the fibre-producing means on one side of the belt 7 being laterally staggered with respect to the corresponding means on the other side of the belt.

FIGURE 1 of the drawings shows distributing heads 6 at different positions of the stroke. The stroke may if desired be varied, provided only that the variation is effected in such manner as to ensure even distribution of the fibres over the whole width of the belt. Thus any fault in distribution that may occur with one head can be evened out, so as not to show the fault running continuously through the mat or web.

The fibre-producing means together with their distributing heads 6 may be disposed at an angle relative to the conveyor belt, which angle may be varied from plus or minus 0–180° as for example shown in FIGURE 4 where all the fibre-producing means with their distributing heads 6 are shown with their longitudinal axes at about an angle of 45° to the longitudinal axis of the belt 7. By varying the inclination of the distributing heads to the longitudinal axis of the belt the ratio of the strength of the web or mat in the longitudinal and transverse directions may be varied as desired within the limits imposed by the conditions of the disposition of the fibres in course of manufacture of the web or mat. Thus the ratio of tensile strength in the longitudinal and transverse directions may be varied within the limits of three quarters to one quarter each way. The variation in the angle of inclination may be effected by the pivotal mounting of the fibre-producing means and the fibre distributing head together.

FIGURE 3 shows a modified construction in which the distributing heads 6 which in the normal stationary position extend above the longitudinal axis of the belt 7 and means are provided to reciprocate the head or the line of heads so that the stroke of each head extends from one edge of the belt to the other. This construction thus varies from that previously described in that the fibre-producing means and the distributing heads 6 are mounted above the middle of the belt 7 and not on each side of the belt. In the drawing, 1 is the oven for melting the glass, 3a are the steam jets by means of which the filament is forced into the distributing head 6, 7 is the belt, 8 the rollers, 11 the suction box, 13 the suction fan and 14 the fan motor.

Figure 7:
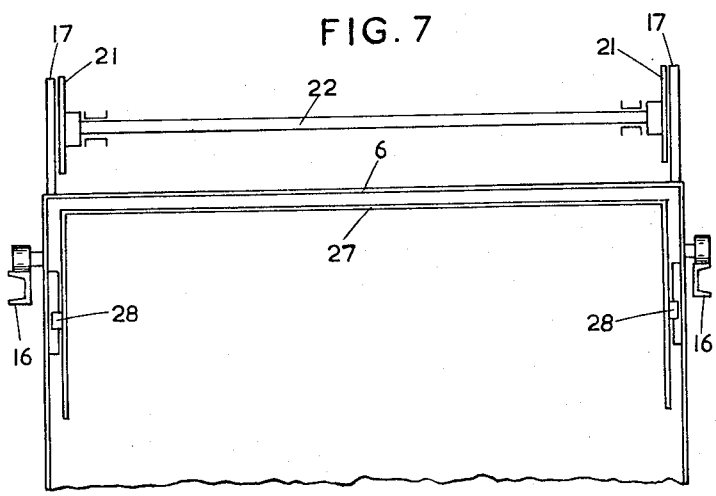
FIGURE 7 is a transverse section on an enlarged scale on the lines A—B of FIGURE 5.

The distributing heads 6 are reciprocated in the direction transversely to the direction of movement of the belt 7, this movement may be effected as illustrated in FIGURES 5, 6 and 7, by a chain and pulley drive 15 which may be driven directly from the drive of the drying drum 2 with intermediate gearing if desired. The heads 6 which are formed to an inverted channel section are provided to move over rails 16 by means of two parallel members 17 and 19 formed on the horizontal part 6a of the head 6 which engage on each side of a pin 18 secured to a chain 20, so that in the rotation of the chain a reciprocated movement is imparted to the heads 6 in the horizontal direction. The chain 20 is mounted on two pulleys 21, one of which is mounted on a shaft 22 which is driven by a chain 23 mounted on two pulleys 24 and 25. The pulley 25 is mounted on a main drive shaft 26 which is driven by the drive of the drum 2 as hereinbefore described.

Thus, as the distributing heads 6 disposed on opposite sides of the belt 7 are driven by the same shaft 26 synchronism of the distributing heads on opposite sides of the belt 7 is obtained.

Means to ensure overlap between the inner end 6a of the head 6 and the upper curved end of the guide member 5 may be provided by an extension 27 (FIGURE 5) of inverted channel section which is provided to extend between the inner end 6a of the head 6 at the inner end of its stroke and the outer end of the member 5. Pins 28 which are mounted on extension 27 move in slots 29 to allow a relative movement of the part 27 with reference to the distributing head 6 to ensure an overlap of the two parts.

C represents the total transverse movement of the distributing head across the belt.

Adjacent distributing heads 6 are geared to move in opposite directions in any one movement so that an even distribution of fibres takes place across the width of the belt 7.

Figure 8:
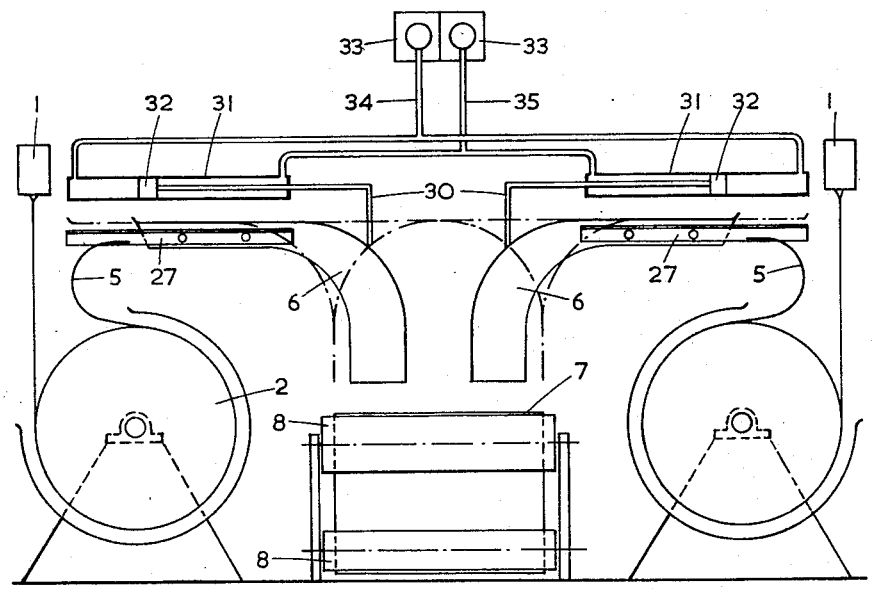
FIGURE 8 is a section showing a pneumatic drive for effecting the transverse movements of the distributing head 6.
Figure 9:
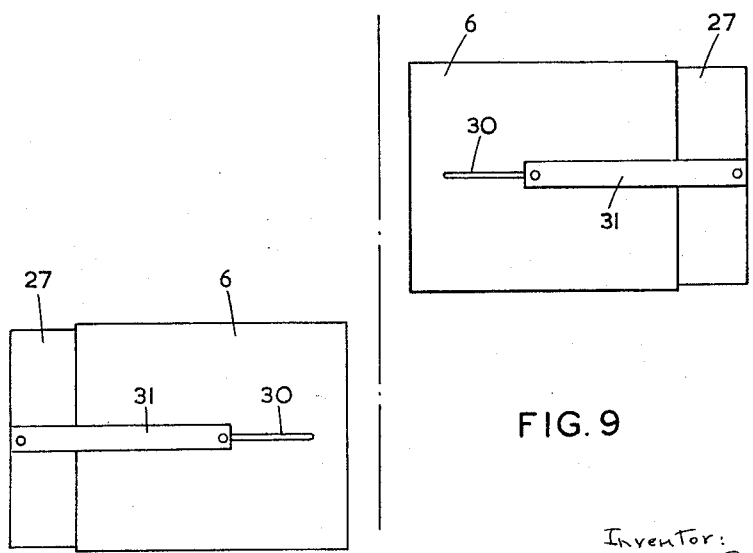
FIGURE 9 is a plan view of FIGURE 8.

Alternatively the means for effecting the transverse movements of the distributing heads 6 may comprise piston connecting rods 30 operating in cylinders 31 as illustrated in FIGS. 8 and 9. The rods 30 are secured at one end to a piston 32 and at the other end are extended downwardly and secured to the heads 6. In operation compressed air, oil or the like from pumps 33 is passed alternately through connecting pipes 34 and 35 into the opposite ends of the cylinder 31 on each side of the piston thus moving the piston to and fro and thus reciprocating the heads 6.

After the deposition of the fibres evenly over the conveyor belt 7 the belt passes over rollers 8 as shown in FIGURE 1 and a resin, plastic or the like is sprayed over the fibres by means of spray devices 36 for the purpose of bonding the fibres together. The belt carrying the mat or web then passes through a drying chamber 37 where the mat is heated advantageously between a temperature of 100°–150° C. for a period of between one to three minutes, a lower temperature and a longer drying time giving a better quality product. The dry mat or web may then be directly wound on a roller 38 as illustrated in the construction of FIGURES 1 and 4 or may after passing through the drying chamber 37 be passed through a separate curing chamber 39 where the sheet is subjected to a temperature of between 180°-220° C. for a period within the range of one to two minutes and wound on a roller 40.

The cured sheet may then be processed by a further coating of any suitable material such as resin or plastic for use for example as tiles or in any other manner.

In operation the filament formed in any suitable manner is drawn as by means of a drawing drum 2 and passed through guide members 5 by controlled air flow to a distributing head 6 which is driven to reciprocate transversely of the moving endless belt 7 and on which the fibres are evenly distributed to fall freely under gravity from the distributing head 6 by a continuous movement extending from one edge of the belt 7 to the other. The fibres pass through the distributing head 6 which is formed as an open channel section which is so shaped and dimensioned that the air is controlled to cause a steady movement of the fibres along the base of the channel section, so as to be deposited freely, evenly and steadily on the moving belt.

As hereinbefore indicated, the ratio of tensile strength in the longitudinal and transverse directions may be varied by varying the speeds of the belt 7 and of the drawing drum 2 and also by the selected angle of the distributing heads 6 to the longitudinal axis of the belt 7. Thus it will be understood that the flow of the fibres being controlled and shielded from the position of formation to the position of deposition on the belt 7 is unaffected by any variation in the climatic conditions in the plant, for example, humidity of the air and the force or direction of air currents.

The invention in its broader aspects is not limited to the specific combination and improvements described, but departures may be made therefrom within the scope of the accompanying claims without departing from the principles of the invention and without sacrificing its chief advantages.

I claim:

1. The method of forming a met of generally uniform density and thickness comprising the steps of: forming individual staple fibres from glass filaments, creating an air current, entraining said staple fibres individually in said air current, controlling the flow of said air current, guiding said air current from the position of entrainment therein of said staple fibres to a fibre deposit position, directing said air current at said fibre depositing position against a travelling air-pervious surface for depositing individual staple fibres thereon, reciprocating the deposit position of said fibres angularly to the direction of travel of said air-pervious surface, and applying a suction force beneath said air-pervious surface in the area of fibre deposit thereon, whereby individual fibres are deposited on said surface in flat overlying relationship to build up a mat of uniform density and thickness.

2. The method as defined in claim 1 including moving said air pervious surface longitudinally and reciprocating said deposit position transeversely to the movement of said surface.

3. The method as defined in claim 1 including the additional steps of applying a binder to said mat and drying and curing said binder.

4. The method of forming a mat of generally uniform density and thickness comprising the steps of: forming individual staple fibres from glass filaments, creating a plurality of air currents, entraining said staple fibres individually in said air currents, controlling the flow of said air currents, guiding each of said air currents in spaced relationship from the position of entrainment therein of said staple fibres to an associated fibre deposit position, directing each of said air currents at its fibre deposit position against a longitudinally travelling air-pervious surface for depositing individual staple fibres thereon, reciprocating each deposit position of said fibres in timed relationship transversely of the direction of travel of said air-pervious surface and applying a suction force beneath said air-pervious surface in the area of fibre deposit thereon, whereby individual fibres are deposited on said surface in flat overlying relationship to build up a mat of uniform density and thickness.

5. Apparatus for forming a mat of generally uniform density and thickness from staple glass fibres comprising in combination means for producing individual staple glass fibres, means for creating an air current, means for entraining individual staple glass fibres by said air current from said producing means, a guide for said air current and fibres, said guide extending from said fibre-producing means toward a fibre deposit station, said guide shielding said fibres therein from outside air currents, a travelling air-pervious receiving member at said deposit station, a distributing head formed as an extension of said guide on the portion thereof extending toward said fibre deposit station, means mounting said head on said guide for reciprocating movement relative thereto with the free end of said head adjacent said air-pervious surface, means for reciprocating said head at an angle to the direction of travel of said air-pervious surface to evenly deposit said individual fibres issuing therefrom across the width of said surface, and means for applying a suction force beneath said air-pervious surface at the area of said fiber deposit.

6. The invention as defined in claim 5 wherein said air-pervious surface includes a longitudinally travelling conveyor and said distributing heads are reciprocated transversely to the direction of travel of said conveyor.

7. Apparatus for forming a mat of generally uniform density and thickness from staple glass fibers comprising means for producing individual glass fibres, means for creating a plurality of air currents, means for entraining individual staple glass fibres by each of said air currents, a traveling air pervious surface, a guide for each air current for channeling its associated air current and individual glass fibres toward said surface, a distributing element operatively associated with each guide for directing said air currents and staple glass fibres against said surface to simultaneously deposit individual fibres at a plurality of locations on said surface, means movably mounting said distributing element for angular movement relative to the direction of travel of said surface, operating means for actuating said distributing elements in synchronism to travel the discharged portion of said elements relative to said surface in predetermined sequence to evenly distribute said staple glass fibres over the width of said surface to form a mat thereon.

8. Apparatus for forming a mat of generally uniform density and thickness from staple glass fibres comprising a plurality of sources of individual glass fibres, means for creating an air current for each of said sources, means for entraining individual staple glass fibres by each of said air currents from each of said related sources, a guide for each air current for channeling its associated air current and individual glass fibres away from its associated source of supply, a longitudinally-moving, air-pervious conveyor, a distributing head operatively associated with each guide for directing said air currents and staple glass fibres against said surface to simultaneously deposit individual fibres at a plurality of locations on said surface, means movably mounting said distributing heads, operating means for actuating said distributing heads in synchronism to travel the discharged portion of said heads relative to said surface in predetermined sequence to evenly distribute said staple glass fibres over the width of said surface, and suction means beneath said conveyor to assist deposit of longitudinal fibres thereon.

9. The invention as defined in claim 7 including means for varying the angular relationship between said distributing elements and said travelling surface, and means for varying the speed of said surface, whereby the ratio of tensile strength of said formed mat in the longitudinal and transverse directions may be selectively controlled.

References Cited in the file of this patent

UNITED STATES PATENTS

| | | |
|---|---|---|
| 1,510,236 | Maussner et al. | Sept. 20, 1924 |
| 2,314,944 | Lamesch | Mar. 30, 1943 |
| 2,333,218 | Pazsiczky | Nov. 2, 1943 |
| 2,518,744 | Barnard | Aug. 15, 1950 |
| 2,566,960 | Philipps | Sept. 4, 1951 |
| 2,736,362 | Slayter et al. | Feb. 28, 1956 |

FOREIGN PATENTS

| | | |
|---|---|---|
| 686,564 | Great Britain | Jan. 28, 1953 |

UNITED STATES PATENT OFFICE
CERTIFICATE OF CORRECTION

Patent No. 2,996,102                      August 15, 1961

Werner Schuller

It is hereby certified that error appears in the above numbered patent requiring correction and that the said Letters Patent should read as corrected below.

Column 3, line 36, for "staples" read -- staple --; column 5, line 45, for "met" read -- mat --.

Signed and sealed this 12th day of December 1961.

(SEAL)
Attest:

ERNEST W. SWIDER
Attesting Officer

DAVID L. LADD
Commissioner of Patents

USCOMM-DC